W. LAMB.
DENTAL HOT AIR APPLIANCE.
APPLICATION FILED JUNE 28, 1909.
953,042.
Patented Mar. 29, 1910.
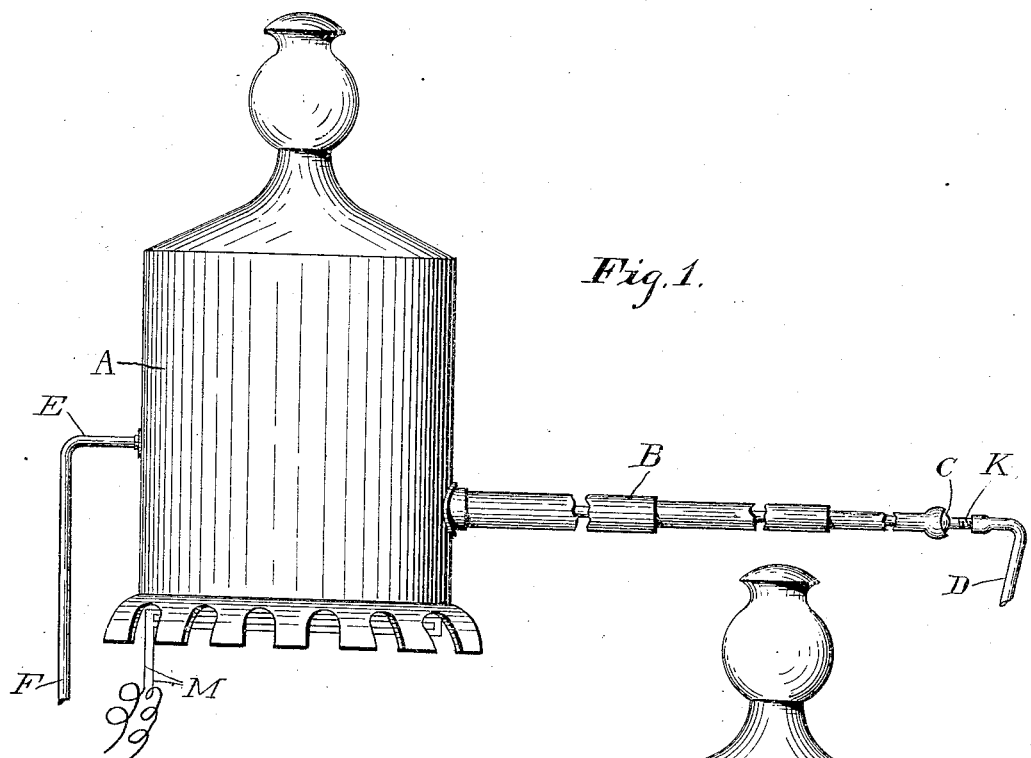
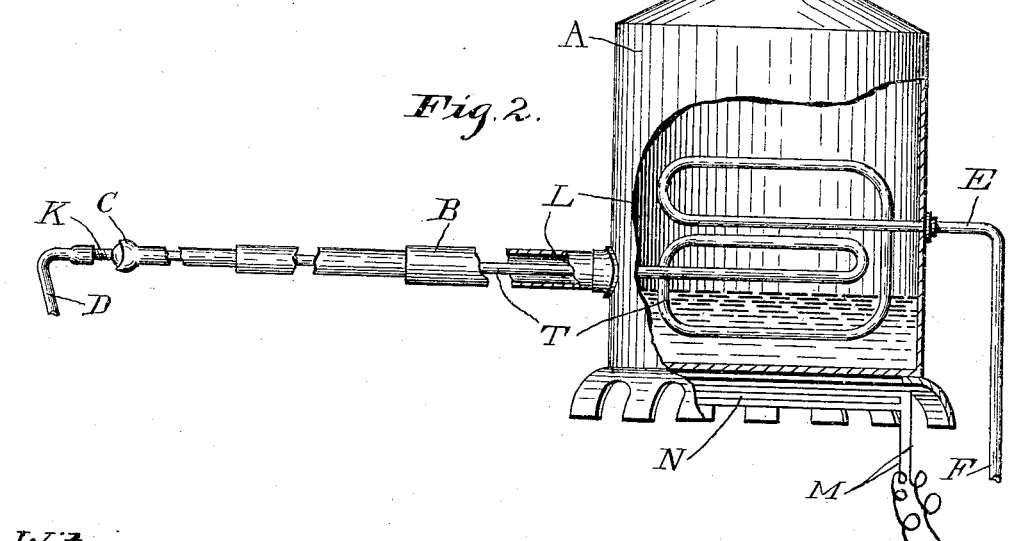
Witnesses:
W. R. Lamb
G. J. Lamb
Inventor:
Walter Lamb

UNITED STATES PATENT OFFICE.

WALTER LAMB, OF HANOVER, PENNSYLVANIA.

DENTAL HOT-AIR APPLIANCE.

953,042. Specification of Letters Patent. Patented Mar. 29, 1910.

Application filed June 28, 1909. Serial No. 504,939.

*To all whom it may concern:*

Be it known that I, WALTER LAMB, a citizen of the United States, residing in Hanover, in the county of York and State of Pennsylvania, have invented a new and useful Improvement in Dental Hot-Air Appliances, of which the following is a specification.

This invention is an improvement in dental hot air appliances, by which the temperature of the heated air can be conserved in its transit from the heating appliance to its destination in a tooth cavity, and by which a regulation of the temperature of the air is effected, by having a fixed degree of heat at a point in the instrument near the part to be operated upon.

The object of the invention is to take away the sensitiveness of the dentine in decayed teeth, by forcing dry warm air of suitable temperature into the cavity, to evaporate the moisture and to thus relieve the pain incident to the excavating process as dentine is not sensitive when it is deprived of moisture.

Instruments for drying the cavities in decayed teeth by means of hot air, have been used for a long time in dentistry; there has been one great objection however to the hot air instruments that have been invented for dental use; they cause more or less pain because there is no certain means of regulating the temperature at which the air is heated, and blasts of air entirely too hot are thrown into the sensitive cavity.

In my invention I do away with the uncertainty of temperature, and dry out the cavity without inflicting pain. My means of heating the air is a reservoir of boiling water and a pipe connecting with, and extending out from the same, through which the water circulates. An air tube is coiled in the reservoir and extends through the pipe the closed extremity of which it pierces. The air tube is then joined by contiguity with another shorter tube that is movable, and adjustable to the tooth. This instrument is fastened to a bracket.

The water in the reservoir may be heated by means of any agent in common use. The air supply may be furnished by a compressed air outfit, by an air pump or by any other apparatus in common use for forcing air. The reason why the air temperature is so perfectly regulated, is because the heat supply is fixed, and the current of air in the pipe does not vary. The air tube in the reservoir is immersed in water at a fixed temperature of 212 degrees. Although there is a perfect circulation of the hot water back and forth through the pipe, the cooling process is so rapid that the temperature at the extremity is about 140 degrees and this temperature at the end of the pipe remains the same. The air upon leaving the hot water pipe is unprotected, and when it enters the movable tube at the ball and socket joint, it cools rapidly, and experience has found that about two inches of unprotected tubing are sufficient to reduce the temperature to about 110 degrees. This temperature can be maintained with but slight variation, as the automatic air supply does not vary materially, and the thermic conditions at the reservoir and water pipe, remain constantly the same. The temperature of the office may change a little, but even this can be offset by screwing on a longer or shorter tip to the adjustable portion of the tube.

The instrument is shown in the accompanying drawings, being detached from the bracket table.

In Figure 1, A is the reservoir, B the pipe connecting with the same, C the ball and socket joint which connects the two portions of the hot air tube (the protected and the unprotected) D is the unprotected portion of the air tube; K is the thread at which longer or shorter tips are screwed on, to lessen or increase the temperature of the air that enters the cavity of the tooth, E is the air tube before it enters the reservoir, F the portion of the same that extends through the bracket table, and to which flexible tubing is attached, M shows the electric cable that extends below the bracket.

In Fig. 2 a portion of the sides of the reservoir A and pipe B have been cut away showing the inside of the same. A is the reservoir; B the pipe; L, L, the cut edges of the same, after a portion of the sides has been removed; T, T shows the air tube as it is coiled in the reservoir and as it extends through the hot water pipe B. N shows a means of heating at the bottom of the reservoir.

Having now particularly described and ascertained the nature of my said invention and what manner the same is to be performed, I declare that what I claim is:

The combination in a pneumatic dental apparatus of a reservoir of water; a means of heating the same; a means of supporting the same; an air tube coiled in said reservoir, and extending out from it at both ends; a means of forcing air through said tube; a salient pipe of water connected with said reservoir and inclosing an extension of said air tube, and being pierced by the latter at its distal extremity; a ball and socket joint at the extremity of the air tube where it emerges from said water pipe; a short movable unprotected tube extending from said ball and socket joint; a nozzle at the extremity of said movable tube substantially as set forth and for the purpose described.

WALTER LAMB.

Witnesses:
J. B. MILLER,
C. J. DELONE.